United States Patent [19]

Takagi et al.

[11] Patent Number: 5,442,453
[45] Date of Patent: Aug. 15, 1995

[54] VIDEO TAPE RECORDER WITH A MONITOR-EQUIPPED BUILT-IN CAMERA

[75] Inventors: Minori Takagi, Tochigi; Kouji Aramaki; Takeshi Ikeda, both of Yaita, all of Japan

[73] Assignee: Sharp Kabushiki Kaisha, Osaka, Japan

[21] Appl. No.: 95,415

[22] Filed: Jul. 22, 1993

[30] Foreign Application Priority Data

Jul. 30, 1992 [JP] Japan .................. 4-203638
Jul. 30, 1992 [JP] Japan .................. 4-203713

[51] Int. Cl.6 .......................................... H04N 5/225
[52] U.S. Cl. ...................... 358/335; 358/906; 348/207; 348/211; 348/374; 348/375; 348/376
[58] Field of Search ............. 358/906, 909, 335, 310, 358/209, 229; H04N 5/225; 439/164, 165; 348/207, 211, 373, 374, 375, 376

[56] References Cited

U.S. PATENT DOCUMENTS

| | | | |
|---|---|---|---|
| 4,262,301 | 4/1981 | Erlichman | 358/209 |
| 4,757,388 | 7/1988 | Someya et al. | 358/209 |
| 4,824,396 | 4/1989 | Sasaki et al. | 439/164 |
| 4,959,729 | 9/1990 | Fukuda et al. | 358/335 |
| 5,043,822 | 8/1991 | Ichiyoshi et al. | 358/229 |
| 5,059,134 | 10/1991 | Schauer et al. | 439/164 |
| 5,073,824 | 12/1991 | Vertin | 348/211 |
| 5,256,075 | 10/1993 | Miyahara et al. | 439/164 |

FOREIGN PATENT DOCUMENTS

| | | |
|---|---|---|
| 0203783 | 5/1986 | European Pat. Off. . |
| 0444584 | 2/1991 | European Pat. Off. . |
| 3918279 | 6/1989 | Germany . |
| 61-71572 | 4/1986 | Japan . |
| 61-150474 | 7/1986 | Japan . |
| 0150474 | 7/1986 | Japan . |
| 63-27169 | 2/1988 | Japan . |
| 63-65981 | 4/1988 | Japan . |
| 1018375 | 1/1989 | Japan . |
| 1106581 | 4/1989 | Japan . |
| 1289379 | 11/1989 | Japan . |
| 4137866 | 5/1992 | Japan . |

*Primary Examiner*—Tommy P. Chin
*Assistant Examiner*—Khoi Truong

[57] ABSTRACT

A VTR with a monitor-equipped built-in camera includes a monitor/VTR portion and a camera portion. The monitor/VTR portion is integrally formed of a VTR portion holding a removable tape cassette and a monitor portion including a liquid crystal display device. A rotary mechanism attaches the camera portion to the monitor/VTR portion in a relatively rotatable manner. The monitor/VTR portion also includes an invertor for inverting a displayed image on the monitor. In the above configuration, the rotary mechanism includes a flexible connecting member for electrically connecting plural rotatable parts. The connecting member includes a coiling portion and first and second connecting portions. The coiling portion has a vortex structure and is disposed in a central portion of the rotary mechanism. The first and second connecting portions are extracted, respectively, from a starting end and a terminal end of the coiling portion, and extend parallel to a coiling central axis of the coiling portion. The first and second portions rotate relative to one another. Furthermore, a cutout portion may be provided in at least one of the first and second connecting portions of the connecting member to reduce stress when the one of the first and second connecting portions is bent.

12 Claims, 17 Drawing Sheets

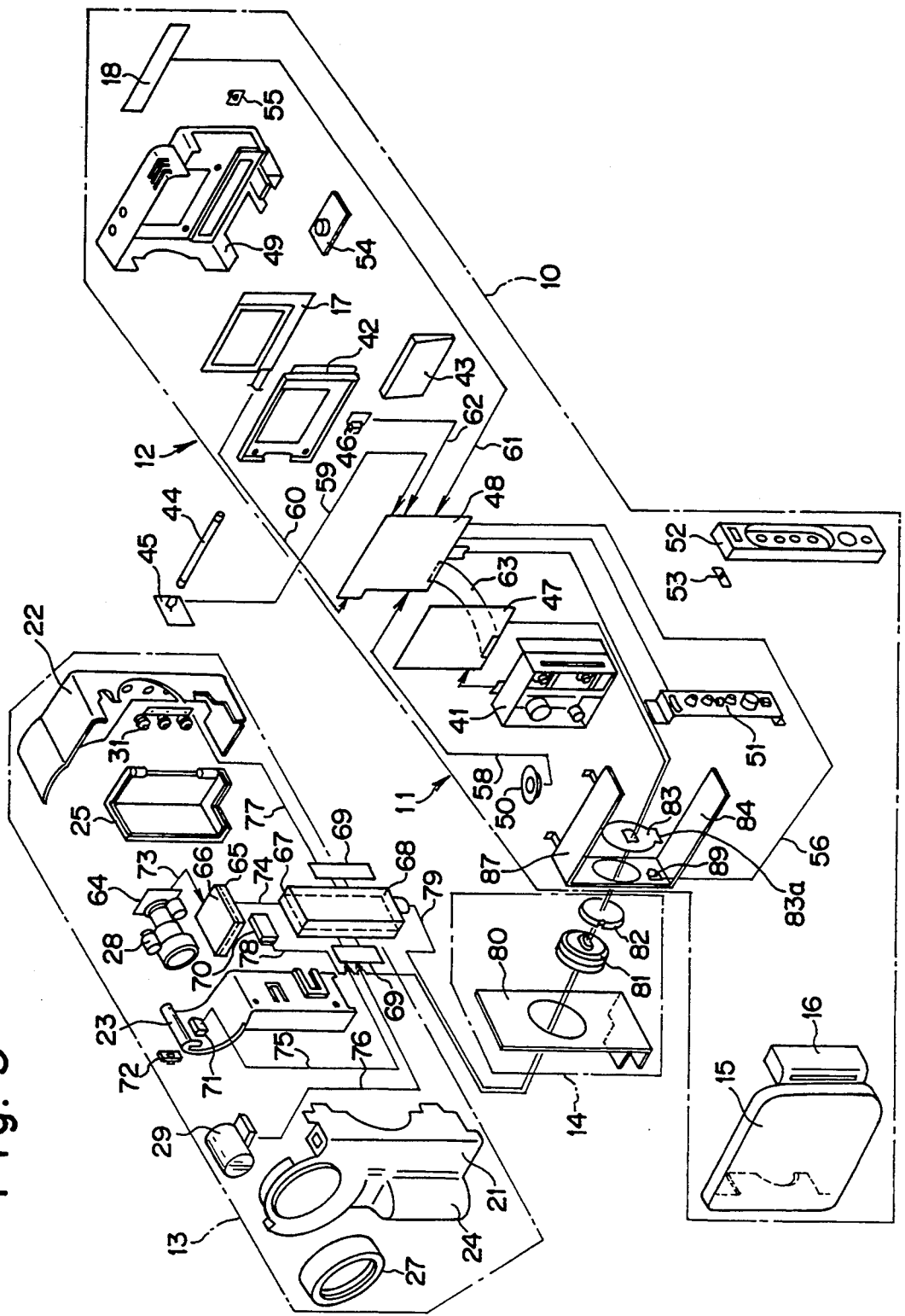

VIDEO TAPE RECORDER WITH A MONITOR-EQUIPPED BUILT-IN CAMERA

BACKGROUND OF THE INVENTION (1) Filed of the invention

The present invention relates to a video tape recorder (to be abbreviated as VTR) with a monitor-equipped built-in camera, and more particularly to a VTR with a monitor-equipped built-in camera including a monitor for visually checking the picture recording condition of a subject and means for connecting between plural separate parts rotatably and electrically.

(2) Description of the Related Art

It is well known that various products of video tape recorders with a camera have been developed and brought into the market with the spread of home video apparatus in recent years. Therefore, first of all, consideration and review on these prior art VTR apparatuses will be made with regard to their advantages and drawbacks.

Initially, FIG. 1 shows an external appearance of a typical prior art VTR with a built-in camera, which includes a camera portion 101, a VTR portion 102 holding a removable tape cassette, a monochrome or color liquid crystal viewfinder 103 for a monitor, an eyepiece 104, a microphone 105 and a main body cabinet 106. The liquid crystal display panel used in viewfinder 103 is as small in its picture frame size as about 1 inch square, so that the image is adapted to be magnified through an ocular lens and observed from eyepiece 104.

Using such a small-sized liquid crystal display panel in viewfinder 103 presents an advantage that the liquid crystal display panel is less expensive. But this configuration suffers from the following drawbacks:

1) monitoring picture is hard to see because an operator must look the image through eyepiece 104 with only one eye;

2) an operator cannot monitor the recording condition while keeping his/her eye away from the camera body (or the operator must take a position to bring his/her eye close to the camera body for monitoring the recording condition);

3) the viewfinder is directed to provide an angular field of view to be taken for an operator only, more than one person cannot observe at the same time; and 4) if an operator tries to take a record of his or her own figure, this configuration requires another larger-sized monitor, but this is hard to realize.

Under such circumstances, in recent years there has been an earnest demand for a VTR with a built-in camera equipped with a monitor which enables an operator and observers, if any, to take a view of the pickup image at some distance without using an eyepiece.

However, in order to provide such a monitor that allows an operator to take a view of the real-time picture at some distance, in place of looking through an eyepiece, the frame size of the monitor becomes considerably large as compared to that of the view finder. In the prior art, the large size of the apparatus has resulted in difficulty in handling the apparatus.

As an example of such the apparatus, there has been disclosed a VTR with a monitor-equipped built-in camera in Japanese Patent Publication Hei 4 No.6154. This apparatus has a VTR portion and a monitor portion arranged integrally side by side, that is, the bottom of the monitor portion is arranged to fit to the VTR portion. A camera portion is supported rotatably on a longitudinal side of the thus integrated monitor/VTR portion having a shape of an elongated rectangular parallelepiped.

In this example, since the VTR portion and monitor portions are arranged side by side to form an elongated parallelepiped in order to make an integrated monitor/VTR portion, the monitor/VTR portion indispensably becomes large, thus limiting the miniaturization of the apparatus.

Further, the publication cited above does not take into account a self-image pickup mode in which an operator records a picture of his or her own image. If the apparatus is used to record the image of the operator by way of experiment, the picture displayed on the monitor portion is upside down or inverted, therefore, the apparatus is far from practical for use in the self-image pickup mode.

On the other hand, a prior art VTR with a built-in camera shown in FIG. 1 includes a rotary mechanism as to be a connecting device at a joint between a main body cabinet 106 and a viewfinder 103. Viewfinder 103 rotates with respect to main body cabinet 106 to be set at a desired rotation angle. Provided inside viewfinder 103 and main body cabinet 106 are electric circuits such as a signal processing circuit for effecting signal processing, therefore the joint for connecting between the two is composed of mechanically and electrically connecting means.

In the above case, the conventional connecting device is arranged as shown in FIG. 3. That is, a connecting portion 103a of viewfinder 103 is fit in with a leaf spring 202, and main body cabinet 106 and a plate metal 204 are fitted to the connecting portion 103a so as to be rotatable, and then a disc 205 is laid over the plate metal 204 and fixed to viewfinder 103 with screws 206, each of which is screwed through a through-hole 205a into a screw hole 103b. Thus, there is provided in main body cabinet 106 a mechanical connecting means allowing viewfinder 103 to rotate with respect to main body cabinet 106.

On the other hand, the electric connection is provided such that a flexible substrate 207 for electrically connecting means is inserted across a hollow portion 208 formed inside the Joint of the mechanically connecting means, and connected at its ends to the connectors (not shown) of respective portions.

Next, the operation of the thus constructed connecting device of the prior art will be described.

In the conventional connecting device, the viewfinder 103, leaf spring 202 and disc 205 united makes a rotational movement against main body cabinet 106 and plate metal 204 on the side of the main body of the VTR with a built-in camera as shown in FIGS. 4 and 5. In the movement, the flexible substrate 207 across hollow portion 208 of the joint is twisted since it is connected at its ends to both connectors.

FIG. 6 is a schematic illustration of essential parts showing a rotation of flexible substrate 207 when it is twisted. In FIG. 6, as viewfinder 103 rotates, flexible substrate 207 rotates while being twisted.

In the conventional connecting device as constructed above, the flexible substrate is twisted by the rotation of viewfinder, if the rotation should be made at a large angle, the flexible substrate is also twisted largely. As a result, there would occur disconnection of the flexible substrate. In addition, the sagging portion caused by and required for the twist of the flexible substrate makes a large movement, so that the substrate interferes with, or comes into contact with the periphery, and this presents the dangers of making frictional noise and disconnection. Further, if additional lead wires and the like are provided in parallel with the flexible substrate, these elements interfere with one another greatly lowering their durability. To avoid these problems occurring, there must be provided a large clearance around the substrate and other elements, this opposes the demand of compactness.

SUMMARY OF THE INVENTION

The present invention has been achieved under circumstances described above. A first object of the present invention is to achieve sufficient reduction or miniaturization of a VTR with a camera which is equipped with a monitor portion of a liquid crystal display panel having a rather large-sized picture frame. A second object of the present invention is to provide a device that allows an operator to picture-record his or her own figure as a subject without any troublesome handling and inconvenience. A third object of the present invention is to improve the battery attachment and gripping performance. Still, a fourth object of the present invention is to provide an apparatus wherein a connecting device allows a large rotational angle while the connecting member has an increased durability and is prevented from interfering with its peripheral members to thereby be compact.

The present invention proposes a novel VTR with a monitor-equipped built-in camera in order to achieve the above objects. The feature and aspect of the present invention will be described as follows.

In accordance with a first feature and aspect of the present invention, a VTR with a monitor-equipped built-in camera comprises:
  a monitor/VTR portion integrally formed of a VTR portion holding a removable tape cassette and a monitor portion including a liquid crystal display device and the like; and
  a camera portion attached to the monitor/VTR portion in a relatively rotatable manner thereto by means of a rotary mechanism; and In accordance with a second feature and aspect of the present invention, a VTR with a monitor-equipped built-in camera comprises:
  a monitor/VTR portion integrally formed of a VTR portion holding a removable tape cassette and a monitor portion including a liquid crystal display device and the like;
  a camera portion attached to the monitor/VTR portion in a relatively rotatable manner thereto by means of a rotary mechanism; and
  an inverting means for inverting a display image on the monitor upside down.

In accordance with a third feature and aspect of the present invention, a VTR with a monitor-equipped built-in camera comprises:
  a monitor/VTR portion integrally formed of a VTR portion holding a removable tape cassette and a monitor portion including a liquid crystal display device and the like;
  a camera portion attached to the monitor/VTR portion in a relatively rotatable manner thereto by means of a rotary mechanism;
  an inverting means for inverting a displayed image on the monitor upside down; and
  a detection means disposed in the rotary mechanism for detecting a rotational state of the camera portion relative to the monitor/VTR portion, and
  the inverting means is driven based on the detected output from the detection means.

In this case, it is advantageous that the aforesaid detection means of rotational state in the camera portion is adapted to generate a detection output when a picture-pickup face of the camera portion is oriented in a direction substantially parallel to the display surface of the monitor portion.

According to a fourth aspect of the invention, a VTR with a monitor-equipped built-in camera comprises:
  a monitor/VTR portion integrally formed of a VTR portion holding a removable tape cassette and a monitor portion including a liquid crystal display device and the like; and
  a camera portion attached to the monitor/VTR portion in a relatively rotatable manner thereto by means of a rotary mechanism, and the rotary mechanism is remote-controlled by a remote control device.

In accordance with a fifth aspect and feature of the invention, a VTR with a monitor-equipped built-in camera comprises:
  a monitor/VTR portion integrally formed of a VTR portion holding a removable tape cassette and a monitor portion including a liquid crystal display device and the like; and
  a camera portion attached to the monitor/VTR portion in a relatively rotatable manner there-to by means of a rotary mechanism, and the monitor/VTR portion has a VTR driving substrate for driving the VTR portion and a monitor driving substrate for driving the monitor portion stacked and integrally sandwiched between the monitor portion and the VTR portion.

In the case, it is effective that the dimensions of the VTR driving substrate and the monitor driving substrate are smaller than the outside dimension of the display surface of the monitor portion.

In accordance with a sixth aspect and feature of the invention, a VTR with a monitor-equipped built-in camera comprises:
  a monitor/VTR portion integrally formed of a VTR portion holding a removable tape cassette and a monitor portion including a liquid crystal display device and the like; and
  a camera portion attached to the monitor/VTR portion in a relatively rotatable manner thereto by means of a rotary mechanism, and the camera portion holds removable batteries as power supply source for the VTR with a monitor-equipped built-in camera and has a battery cover for covering and protecting the batteries and serving also as a camera grip.

According to the present invention, with regard to any of the above-stated aspects of the invention, the rotary mechanism comprises:
  a flexible connecting member for electrically connecting plural rotatable parts and
  the connecting member comprises a coiling portion having a vortex structure and disposed in the central portion; and
  first and second connecting portions extracted respectively from a staring end and a terminal end of the coiling portion and extended in parallel with a coiling central axis but in opposite directions, and the coiling state of the coiling portion is changed so that the first and second connecting portions can be rotated relatively one another.

Still, according to the invention, in regard to any one of the aspects described above, the rotary mechanism comprises:
a flexible connecting member for electrically connecting plural rotatable parts, and
the connecting member comprises a coiling portion having a vortex structure and disposed in the central portion; and
first and second connecting portions extracted respectively from a staring end and a terminal end of the coiling portion and extended in parallel with a coiling central axis but in opposite directions, and
the coiling state of the coiling portion is changed so that the first and second connecting portions are rotated relatively one another, and at least one of the first and second connecting portions is provided with a cutout portion for relieving the stress acted on the connecting portion when the connecting portion is bent substantially, perpendicularly relative to the coiling central axis of the coiling portion.

In this case, it is effective that the center portion of the coiling portion of the connecting member has a hollow portion and a supporting member is provided which has a supporting portion inserted into the hollow portion for supporting the connecting member.

In the same case, it is also advantageous that the supporting portion of the supporting member is provided with a hollow portion through which connecting cables such as lead wires and the like are passed.

According to the present invention having configurations described above, in order to integrate a monitor portion of a liquid crystal display having a rather large-sized screen with a VTR portion to construct monitor/VTR portion, a VTR substrate and a liquid crystal substrate are piled and sandwiched between the monitor portion and the VTR portion. Therefore, the apparatus can be largely small-sized as compared to the prior art example in which a monitor portion and a VTR portion are put together side by side to form an integrated rectangular body. Of course, the camera portion is arranged relatively rotatable with respect to the monitor/VTR portion. Thus, an operator can visually check the picture recording condition of a subject displayed on the relatively large-sized monitor portion and keep his or her eyes away from the monitor while freely setting up a camera angle.

Further, according to the present invention, the camera portion can be rotated through the rotary mechanism so that the picture-pickup face of the camera portion may be oriented in the same direction with the face of the monitor portion, therefore an operator can readily take his or her own figure as a subject while observing the subject on the monitor portion without providing another separate monitor. In addition, the inversion detecting switch is changed over in link with the inversion of the camera portion, so that the display image is inverted upside down. This allows an upright subject image to be monitored, thus facilitating picture-recording in the self-image pickup mode.

Still, according to the present invention, since batteries are contained in the camera portion and covered by the battery cover that also serves as the grip, the installation of the batteries can be assured reliably as well as improving the gripping performance.

Moreover, in the present invention, by providing a rotary portion as a part of the connecting means as well as providing of a fixing member for fixing the connecting means, it is possible to provide a larger rotational angle, an improved durability and make the device compact.

BRIEF DESCRIPTION OF THE DRAWINGS

FIG. 9 is a perspective exploded view showing an inner structure of a VTR with a monitor-equipped built-in camera of the embodiment;

DESCRIPTION OF THE PREFERRED EMBODIMENTS

An embodiment of a VTR with a monitor-equipped built-in camera of the present invention will hereinafter be described in detail with reference to the accompanying drawings.

Figure 1:
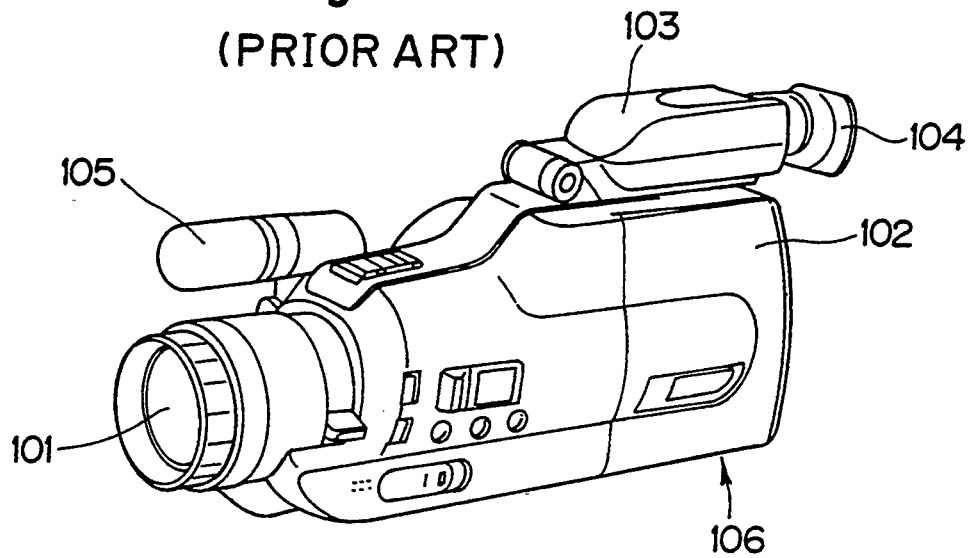
FIG. 1 is a perspective view showing an appearance of a typical VTR with a monitor-equipped built-in camera in accordance with a prior art.
Figure 2:
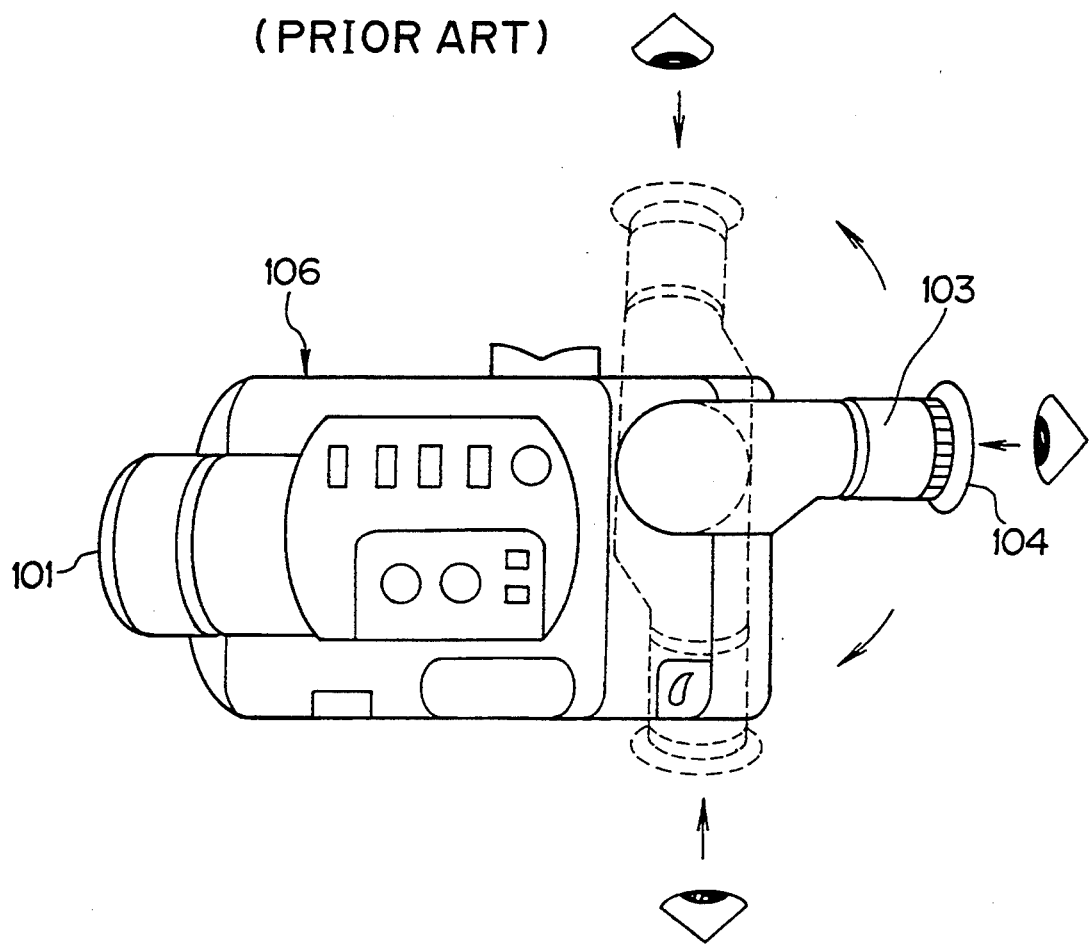
FIG. 2 is a schematic illustrative view showing an example of a connecting device in accordance with a prior art.
Figure 3:
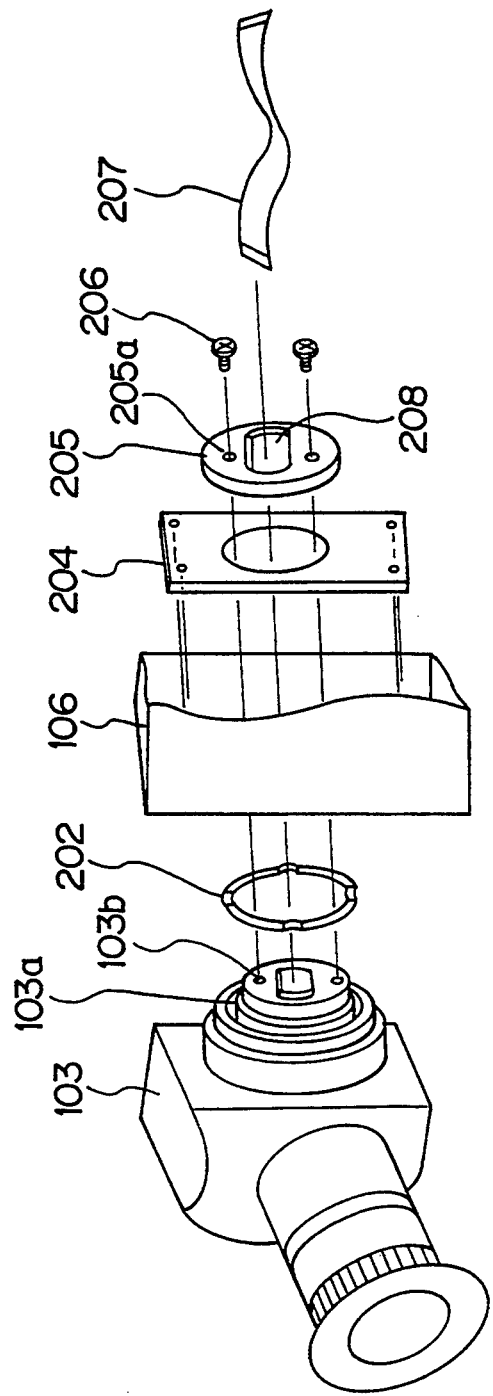
FIG. 3 is a perspectively exploded illustration showing essential parts of an embodiment of a connecting device in accordance with a prior art.
Figure 4:
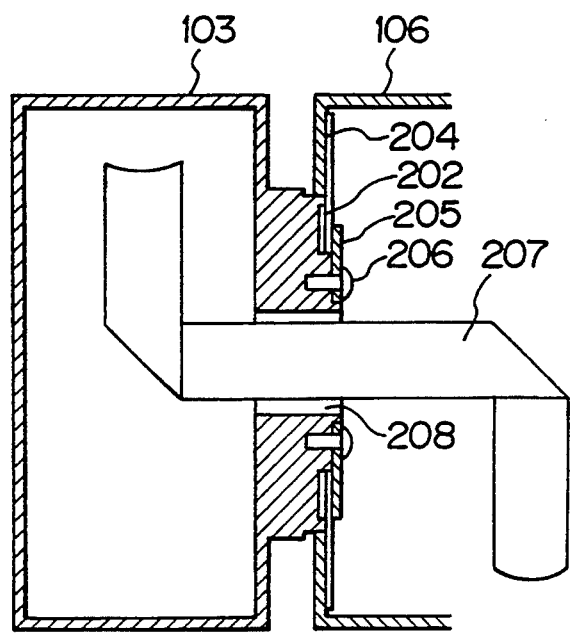
FIG. 4 is a sectional illustrative view showing essential parts of an embodiment of a connecting device in accordance with a prior art.
Figure 5:
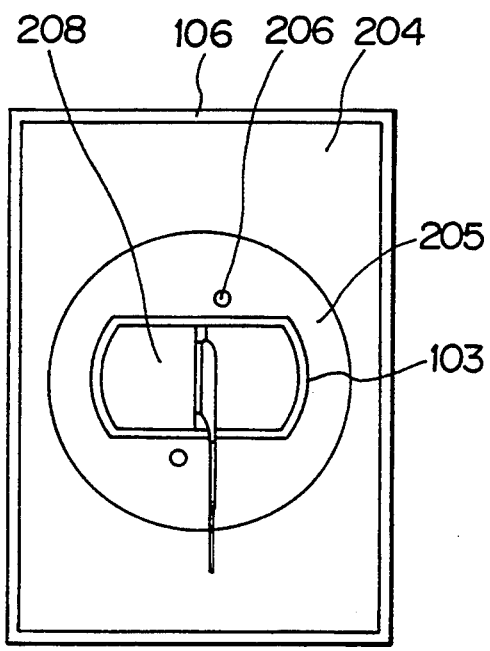
FIG. 5 is a front illustrative view showing essential parts of an embodiment of a connecting device in accordance with a prior art.
Figure 6:
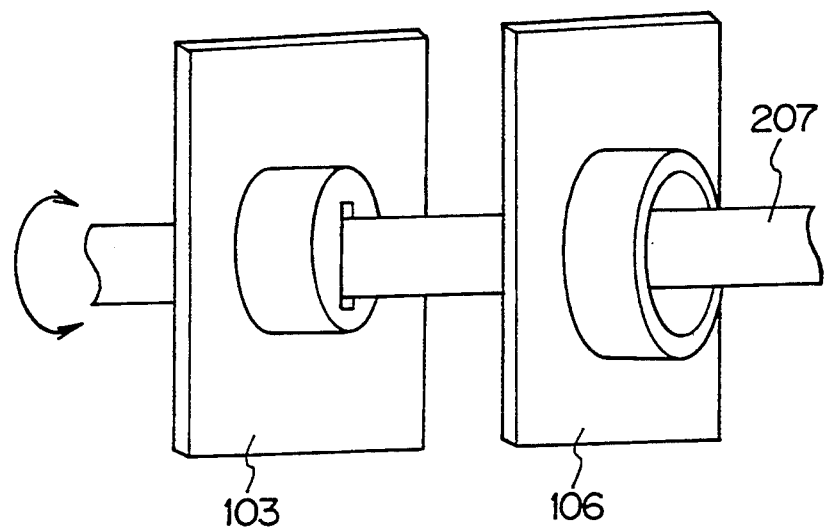
FIG. 6 is a schematic operative illustration showing essential parts of an embodiment of a connecting device in accordance with a prior art.
Figure 7:
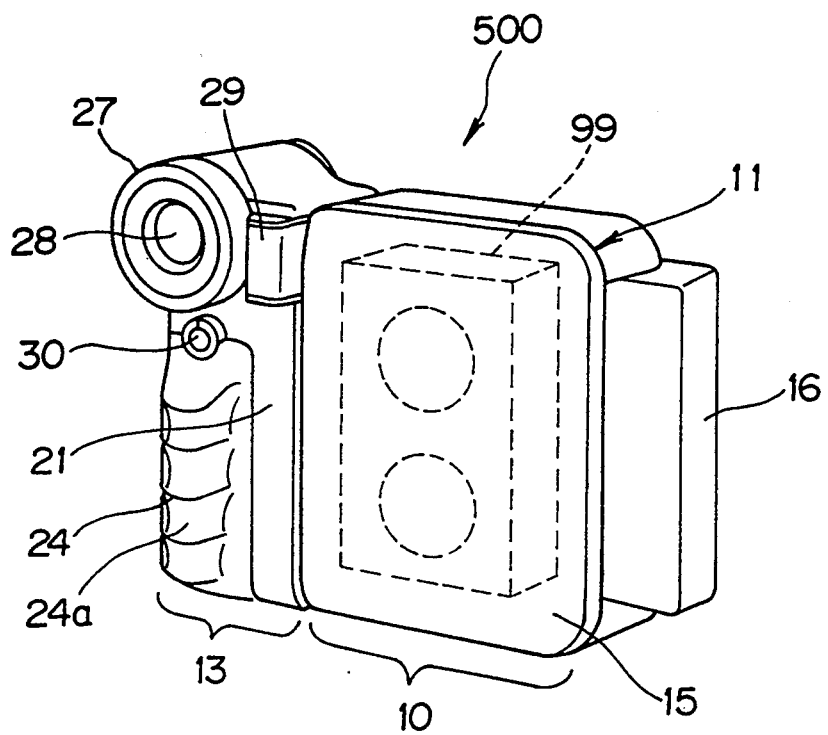
FIG. 7 is a perspective view showing a front appearance of a VTR with a monitor-equipped built-in camera of an embodiment of the present invention.
Figure 8:
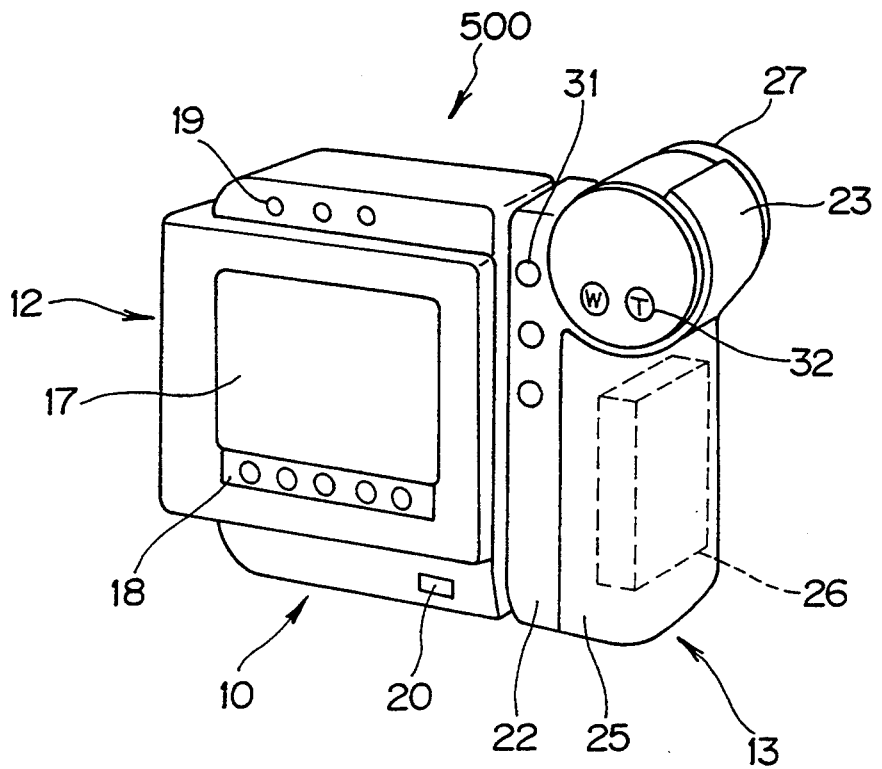
FIG. 8 is a perspective view showing a backside appearance of a VTR with a monitor-equipped built-in camera of the embodiment.

FIG. 7 is a perspective view of a VTR with a monitor-equipped built-in camera of an embodiment viewed from the front side, and FIG. 8 is a perspective view of the same viewed from the backside. In FIGS. 7 and 8, the VTR with a monitor-equipped built-in camera, designated at 500, is shown being set on a table, board or other horizontal plane.

In these figures, reference numeral 10 designates a monitor/VTR portion, integrally composed of a VTR portion 11 holding a removable tape cassette 99 and a monitor portion 12 having a liquid crystal display panel. Reference numeral 13 designates a camera portion, which is attached on one side of monitor/VTR portion through a rotary mechanism 14 (to be detailed later) so as to be rotatable relative to the portion 10, and which incorporates an inverting means for making the display image on the monitor portion 12 upside down. A cassette lid removably attached from VTR portion 11 is designated at 15, and a grip portion disposed integrally with cassette lid 15 is designated at 16. Further, there are provided a liquid crystal display panel 17, a VTR control panel 18, liquid crystal control buttons 19, a light-receiver for remote control 20, a front part 21 of camera cabinet, a rear part 22 of camera cabinet, a middle part 23 of camera cabinet, a grip portion 24, a battery cover 25, a battery 26, a lens shutter 27, a lens unit 28, a microphone 29, a start/stop switch 30, camera control buttons 31 and zooming buttons 32.

Grip portion 24 is formed on front part 21 of camera cabinet of camera portion 13 in order that the apparatus may be stably supported for picture recording when an operator holds grip portion 16 of monitor/VTR portion 10 in his/her left hand and grips battery cover 25 of camera portion 13 in his/her right hand. Further, this structure allows the right hand to grip battery cover 25, thus assuring the reliability of attachment of battery 26. In order to improve the gripping performance for grip portion 24 of camera portion 13, finger-receiving portion 24a is shaped on grip portion 24. Operating switches are arranged such that start/stop switch 30 is pressed with a forefinger and camera control buttons 31 and zooming buttons 32 are handled with a thumb.

FIG. 9 is a perspective exploded view showing the inner structure of the with a monitor-equipped built-in camera. In this figure, VTR 500 is shown generally classified into three blocks, that is, monitor/VTR portion 10, camera portion 13 and rotary mechanism 14. Rotary mechanism 14 is to connect monitor/VTR portion 10 with camera portion 13 such that the former may rotate within about 270° relative to the latter.

Initially, monitor/VTR portion 10 will be described. Monitor portion 12 is formed as a unit of a VTR mechanism unit 41 with which removable tape cassette 99 is engaged; a liquid crystal monitor holder 42, which includes a liquid crystal display panel 17; a light-leading plate 43; and a backlight 44 fixed with terminal plates 45, 46 in an electrically and mechanically connecting manner. In order to drive VTR mechanism unit 41, there is provided a VTR substrate 47, on which a recording/playing circuit and all the other required circuits for functioning the VTR are equipped as well as driving circuit for driving VTR mechanism unit 41. Reference numeral 48 designates a liquid crystal substrate for driving monitor portion 12. The liquid crystal substrate 48 includes a signal processing circuit, a circuit for backlight and other circuits as well as a driving circuit for liquid crystal display panel 17.

Further, the aforementioned VTR substrate 47 and liquid crystal substrate 48 are sandwiched between VTR mechanism unit 41 of VTR portion 11, and liquid crystal monitor holder 42 holding liquid crystal display panel 17 of monitor portion 12. These four members are stacked and integrated. This is one of main features of this invention. In this structure, the maximal dimension of VTR substrate 47 and liquid crystal substrate 48 is limited to within the outside dimension of liquid crystal display panel 17, so that the whole part of monitor/VTR portion 10 may be designed compact. The sandwich structure, i.e., VTR mechanism unit 41, VTR substrate 47, liquid crystal substrate 48 and liquid crystal monitor holder 42 are incorporated into a cabinet 49, and covered by cassette lid 15 with grip portion 16.

Monitor/VTR portion 10 further includes a control panel 18 disposed on the front side of cabinet 49, a speaker 50, terminal plates 51, a terminal plate cover 52, a knob 53, a tripod socket nut 54, a knob 55 and connecting cables 56 to 63.

Next, camera portion 13 will be described. Fixed at a rear end of a lens unit 28 is a CCD image-pickup device substrate 64. There are provided a CCD image-pickup device driving substrate 65, a shield board 66, a signal processing substrate 67, a shield board 68, a sub-substrate 69, a battery terminal plate 70, a power switch 71, a knob 72 and connecting cables 73 to 79.

Battery wire cable 78 leading out from battery terminal plate 70, and flexible cable 79, leading out from signal processing substrate 67, are introduced into monitor/VTR portion 10 through the center of rotary mechanism 14 to supply electric power. CCD image-pickup substrate 64 incorporates therein a CCD image-pickup device for transforming optical signals from lens unit 28 into electric image signals. CCD image-pickup device driving substrate 65 includes all the circuits required for operating the camera, such as a timing circuit for driving the CCD image-pickup device, a signal processing circuit, an automatic white-balancing circuit, an automatic focusing circuit, etc.

Attached in middle part 23 of the camera cabinet are lens unit 28, CCD image-pickup substrate 64, CCD image-pickup device driving substrate 65, signal processing substrate 67, sub-substrate 69, battery terminal plate 70, power switch 71 and other elements. This provision of all the parts for camera functions to middle part 23 of the camera cabinet is to make the assembling thereof easy, and to allow easy adjustment of the camera. The image-pickup signals are transmitted through flexible cable 79 to VTR substrate 47 so as to be recorded on tape cassette 99 in VTR mechanism unit 41. The signals are also transmitted to liquid crystal substrate 48 so that liquid crystal display panel 17 may simultaneously display the pickup image as it is taken. It is noted that liquid crystal display panel 17 can also be used to display a regenerated picture upon the reproduction of removable tape cassette 99 in VTR mechanism unit 41.

The VTR with a monitor-equipped built-in camera 500 shown in FIGS. 7 and 8 described heretofore is set in a storage position at non-use. In this non-use storage position, camera portion 13 is aligned with monitor/VTR portion 10, or more specifically, the horizontal scan direction of liquid crystal display panel 17 is set perpendicular to the longitudinal direction of camera portion 13. The pickup face of lens unit 28 is opposed to liquid crystal display panel 17, and perpendicular to the direction in which VTR mechanism unit 41, VTR substrate 47, liquid crystal substrate 48 and liquid crystal display panel 17 are piled up, or parallel to liquid crystal display panel 17.

Meanwhile, as one of important components of the invention, there is provided an inverting means for making the display image on monitor portion 12 upside down. This inverting means eliminates the inconvenience of an inverted image which would be displayed when an operator tries to pick up his or her own figure by him- or herself with the prior art VTR.

Specifically, camera portion 13 can be rotated relative to monitor/VTR portion 10 within a range of about 270° by means of rotary mechanism 14, which will be described hereinafter. Further, provided on a mechanism holding metal member 84 integrated with a monitor/VTR portion cabinet 87 is an inversion detecting switch 89 that is activated when camera portion 13 is rotated relative to monitor/VTR portion 10 about 180° from the non-use storage position a projection 83a for activating the inversion detecting switch 89 is formed on a periphery part of a pressing plate 83. This inversion detecting switch 89 causes the display image on liquid crystal display panel 17 to invert (turn upside down) when activated by projection 83a. The inversion detecting switch 89 is connected through connecting cable 56 to an unillustrated IC for image upside-down inversion.

Figure 10A:
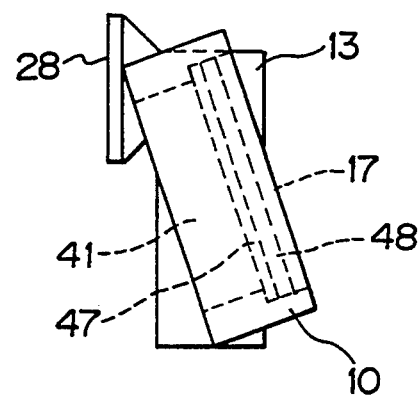
FIGS. 10A to 10C are illustrative views respectively showing different modes of a VTR with a monitor-equipped built-in camera of the embodiment where a relative angle made between a camera portion and a monitor/VTR portion is varied.
Figure 10B:
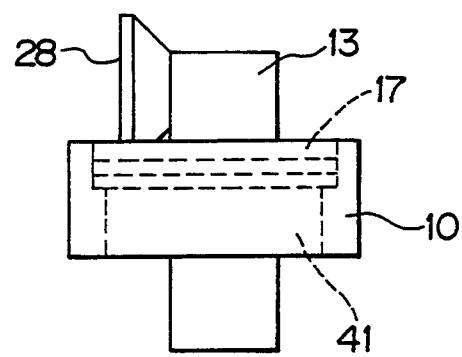
Figure 10C:
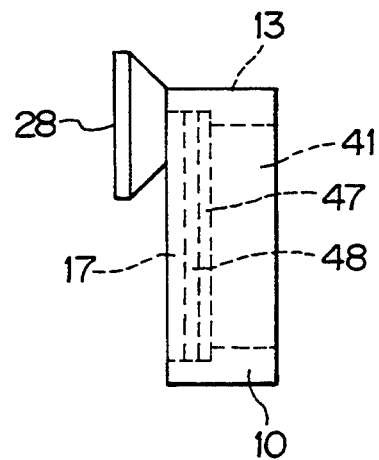
Figure 24:
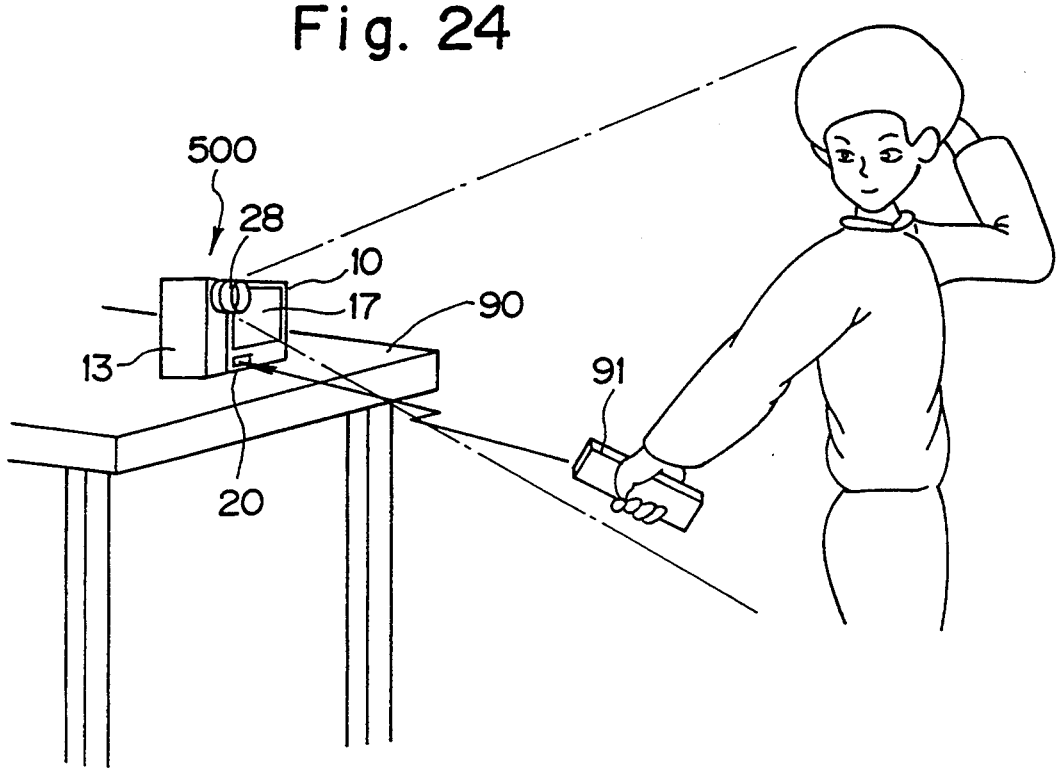
FIG. 24 is an illustration showing a use mode of a VTR with a monitor-equipped built-in camera of the embodiment wherein picture-recording is effected in self-image pickup mode.

The position in which inversion detecting switch 89 is activated by the 180° rotation of camera portion 13 from the non-use storage position is shown in FIG. 10C. In other words, switch 89 is made active when the pickup face of lens unit 28 is oriented in the direction coincident with that of liquid crystal display panel 17 with respect to the direction in which VTR mechanism unit 41, VTR substrate 47, liquid crystal substrate 48 and liquid crystal display panel 17 are stacked. Thus the mode in which the pickup face and liquid crystal display panel 17 are oriented in the same direction is used when an operator takes his or her own figure as a subject by him- or herself as shown in FIG. 24, which will be detailed hereinafter.

Figure 11:
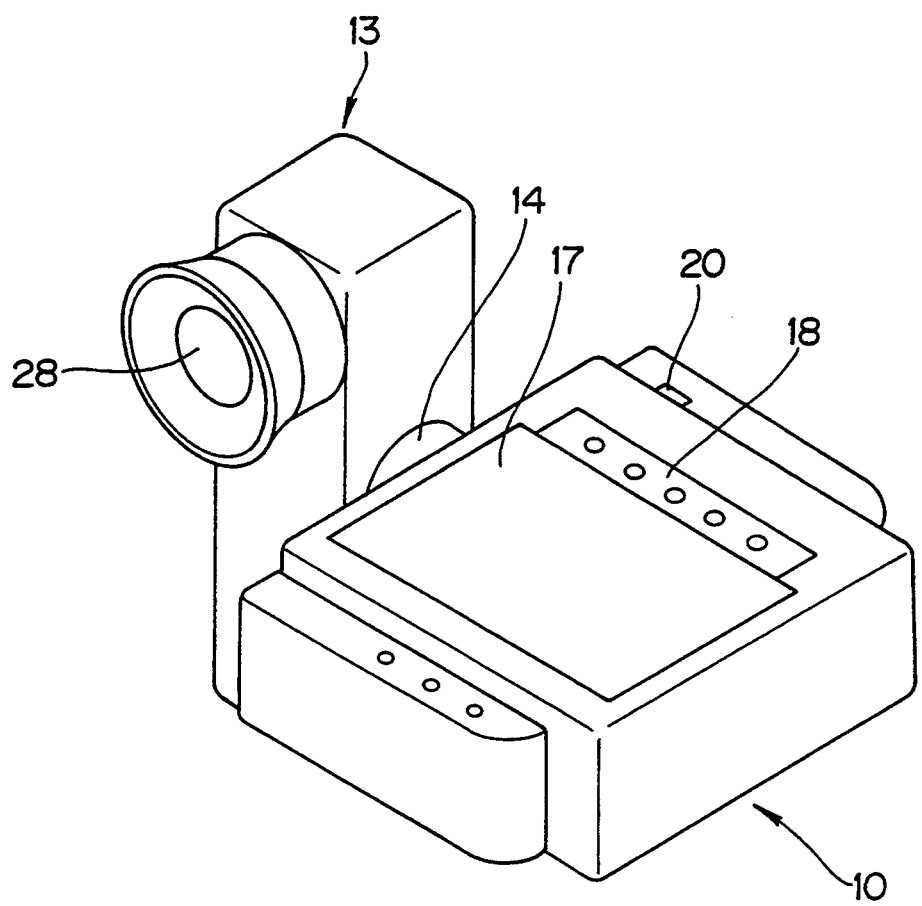
FIG. 11 is a perspective view showing a VTR with a monitor-equipped built-in camera where the relative angle is 90° in correspondence with FIG. 10B.

FIG. 10A shows a position in which monitor/VTR portion 10 is relatively rotated 18° through rotary mechanism 14 in counterclockwise direction relative to camera portion 13. FIG. 10B shows a position in which monitor/VTR portion 10 is rotated 90° in counterclockwise direction relative to camera portion 13. The mode in which the camera portion 13 is rotated at 90° is shown perspectively in FIG. 11. FIG. 10C shows a position in which monitor/VTR portion 10 is rotated 180° relative to camera portion 13, that is, a position in which the pickup face of lens unit 28 and liquid crystal display panel 17 is oriented in the same direction. This position is for self-image pickup mode, but may be applicable to the non-use storage position.

Although the above description has been made on an embodiment in which the changeover of upside-down inversion of the image to be displayed on liquid crystal display panel 17 is carried out automatically when camera portion 13 is rotated 180° relative to monitor/VTR portion 10, it is obvious that the embodiment should not limit the invention. For example, the changeover may be controlled with a manual switch, or with a remote control to effect the upside-down inversion. Alternatively, plural modes such as automatic mode and manual mode may be provided to perform the changeover of image inversion automatically and manually.

Next, detailed description will be made of rotary mechanism 14 used in the video tape recorder with a monitor-equipped built-in camera in accordance with the invention.

Initially, referring to the embodiment shown in FIG. 9, rotary mechanism 14 includes a spacer holding metal member 80, a spacer 81, a leaf spring 82, a pressing plate 83, a mechanism holding metal member 84. This rotary mechanism 14 is shown more specifically in a sectional view of FIG. 12 and a side view of FIG. 13.

Figure 12:
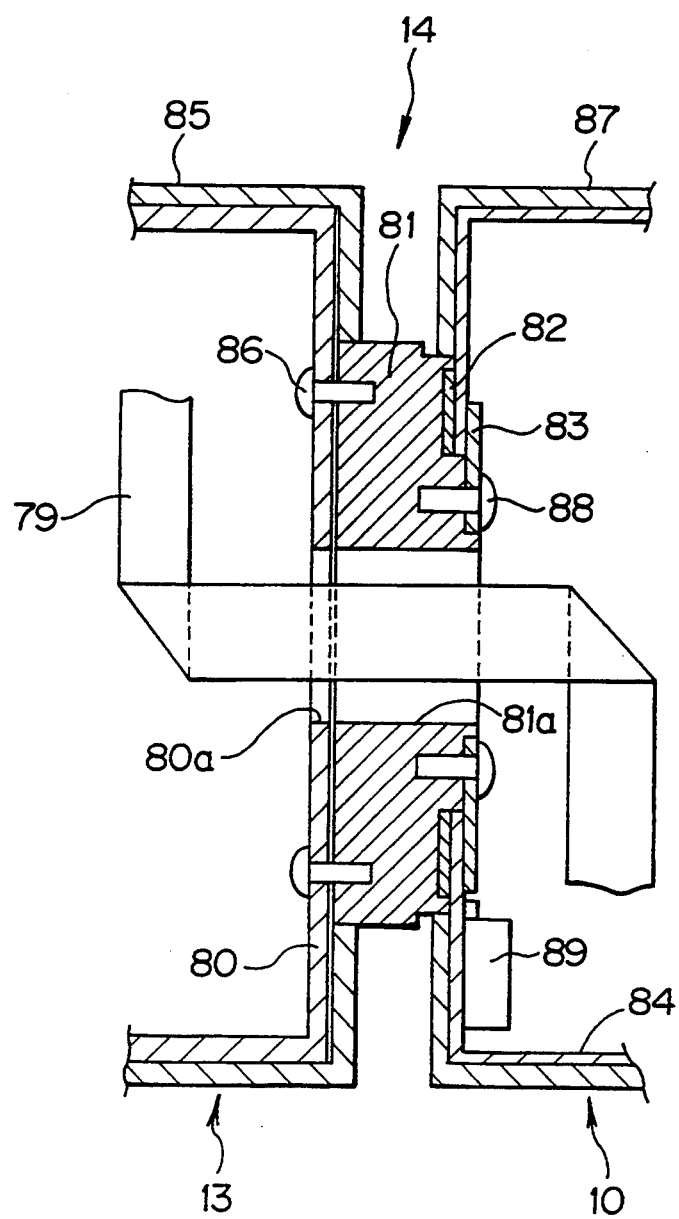
FIG. 12 is a sectional view showing a structure of a rotary mechanism in a VTR with a monitor-equipped built-in camera of the embodiment.
Figure 13:
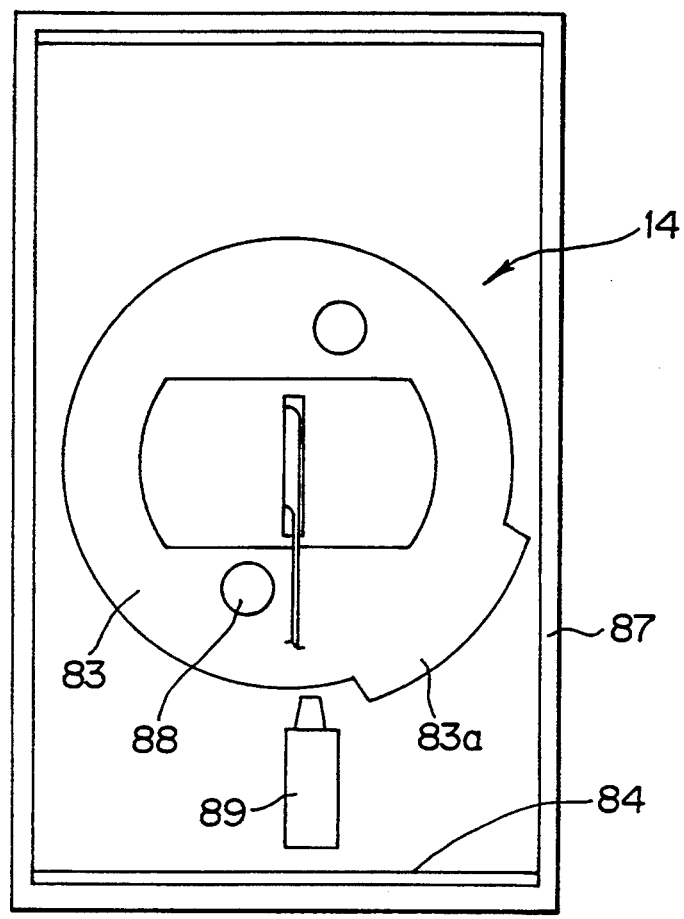
FIG. 13 is a side view showing a structure of the same rotary mechanism.

In these figures, reference numeral 89 designates the above-mentioned inversion detecting switch, and when the switch is activated by projection 83a, the display image on liquid crystal display panel 17 may be made to invert upside down. The other configurations of rotary mechanism 14 in the embodiment exemplified in FIGS. 12 and 13 are substantially similar to those in the prior art. That is, spacer holding metal member 80 is integrally fit in camera portion cabinet 85 while being fixed with spacer 81 by screw bolts 86. On the other hand, mechanical holding metal member 84 is integrally fit in monitor/VTR portion cabinet 87, and is held tightly but resiliently between leaf spring 82 set on the stepped bottom face of spacer 81 and pressing plate 83 fixed to the stepped top face of spacer 81 with screws 88.

Camera portion cabinet 85 and monitor/VTR portion cabinet 87, and therefore camera portion 13 and monitor/VTR portion 10 are jointed in a relatively rotating manner through spacer 81 and the sandwiching structure of mechanical holding metal member 84 held between leaf spring 82 and pressing plate 83 in rotary mechanism 14. Upon rotation of camera portion 13 relative to monitor/VTR portion 10, it is possible to stop camera portion 13 stably at an arbitrary angle relative to monitor/VTR portion 10 by the frictional resistance force caused by the elastically pressing force due to leaf spring 82. Flexible cable 79 is stretched between camera portion cabinet 85 and monitor/VTR portion cabinet 87 through central through-holes 80a, 81a of spacer holding metal member 80 and spacer 81.

Meanwhile, the present invention proposes as an effective, improved means, that the aforementioned rotary mechanism 14 comprises a flexible connecting member for electrically connecting plural rotatable parts, and the connecting member comprises: a coiling portion having a vortex structure disposed in the central portion; and first and second connecting portions extracted respectively from a starting end and a terminal end of the coiling portion and extended in parallel with a coiling central axis but in opposite directions. The present invention proposes as a further improved means that in addition to the above configurations, the coiling state of the coiling portion is changed so that the first and second connecting portions are rotated relative to one another, and at least one of the first and second connecting portions is provided with a cutout portion for relieving the stress acting on the connecting portion when the connecting portion is bent substantially, perpendicular relative to the coiling central axis of the coiling portion.

Referring now to FIGS. 14 to 18, description will be made of an embodiment of a connecting means according to the invention being applied to a connecting device for a viewfinder of VTR.

Figure 14:
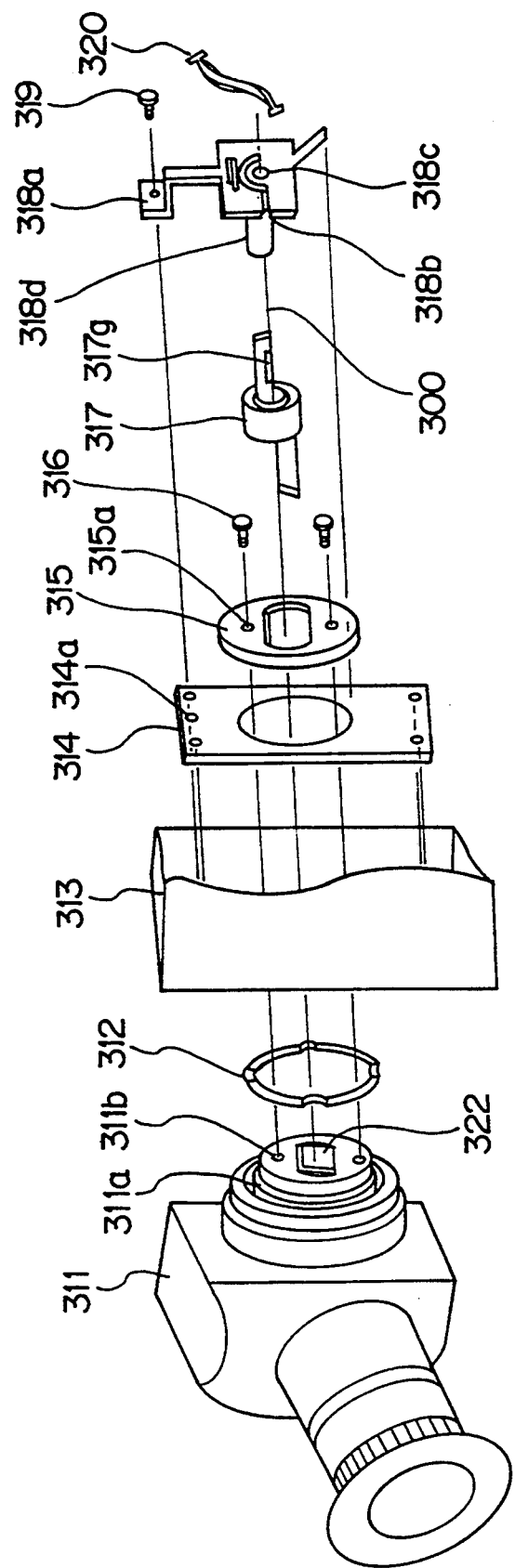
FIG. 14 is a schematically illustrative structural view showing an embodiment of a connecting means used in the present invention.
Figure 15:
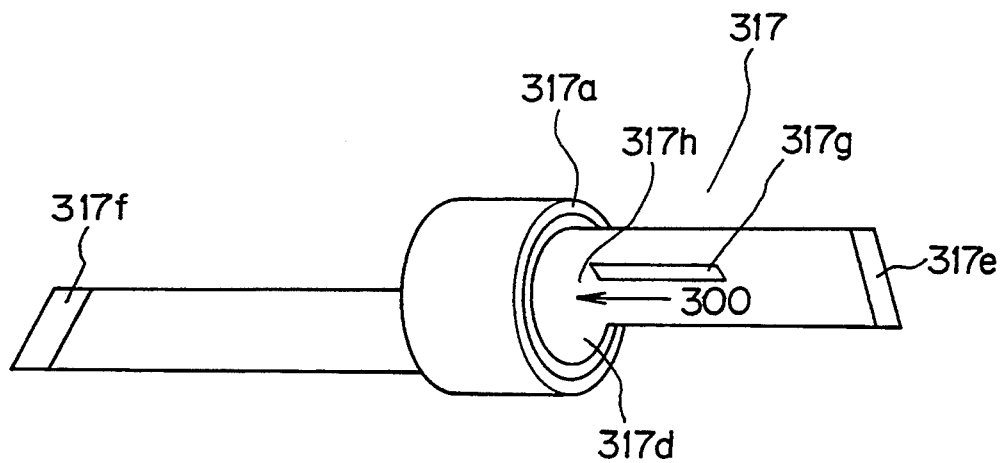
FIG. 15 is an illustration showing essential parts of an embodiment of a connecting means used in the present invention.
Figure 16:
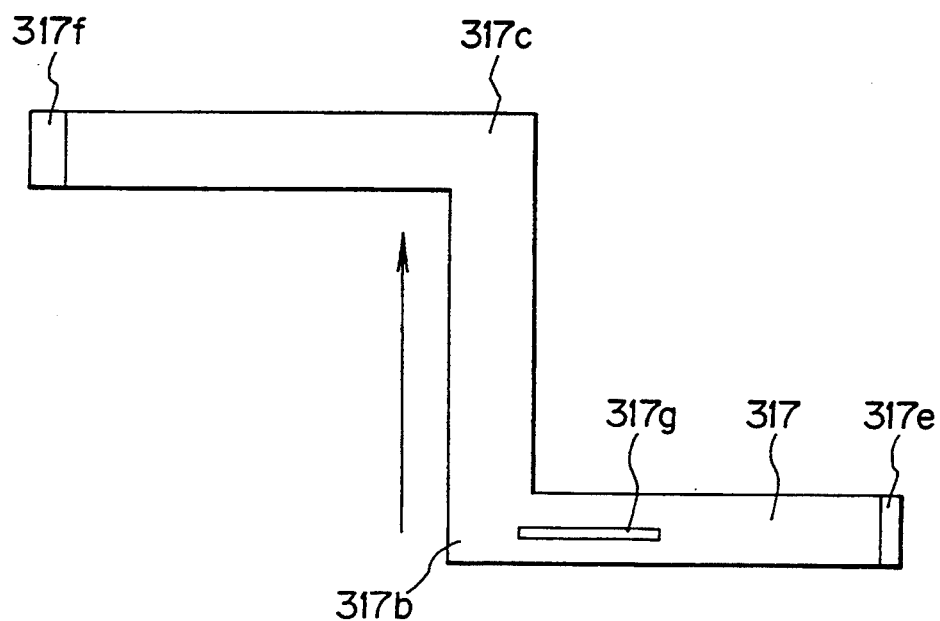
FIG. 16 is an expanded view showing essential parts of the embodiment of a connecting means used in the present invention.

First, as shown in FIGS. 14 to 16, which are schematic illustrations of the embodiment according to the invention, a connecting portion 311a of a viewfinder 311 is fit in with a leaf spring 312, and a main body cabinet 313 and a metal plate 314 are fitted to the connecting portion 311a so as to be rotatable, and then a disc 315 is laid over the plate metal 314 and fixed to viewfinder 311 with screws 316, each of which is screwed through a through-hole 315a into a screw hole 311b. Thus, there is provided in main body cabinet 313 a mechanical connecting means allowing viewfinder 311 to rotate with respect to main body cabinet 313.

On the other hand, the electric connection is provided through a flexible substrate 317, The flexible substrate 317 is attached to a fixing holder (supporter) 318. The electrical connection is inserted across a hollow portion 322 formed inside the joint of the mechanically connecting means, and connected at its ends to the connectors (not shown) of respective electric circuits. In FIG. 14, the flexible substrate designated at flexible substrate 317 used for electrically connecting means includes a strip-like member being wound up into a coil at a central axis 300 as a coiling center, as will be described later.

Referring now to FIGS. 15 and 16, the above flexible substrate 317 serving as connecting means will be described.

FIG. 15 is an illustration of essential parts showing a rotary portion of flexible substrate 317 of the connecting means, and FIGS. 16 is an expanded view of flexible substrate 317.

As shown in FIG. 15, flexible substrate 317 has a coiling portion 317a in the center. The coiling portion 317a is formed by winding up the strip from a corner 317b to another corner 317c shown FIG. 16 in plural times into a coil having a central axis 300. A cutout slit 317g is provided for the expanded flexible substrate on the starting side of the coiling. This slit 317g allows a center portion 317h of the substrate to be bent circularly without undergoing any stress at the bending portion. In this case, as described previously, flexible substrate 317 has coiling portion 317a, which is made by winding up the strip-like member into a coil, and first and second connecting portions 317e and 317f extending in the opposite directions in parallel with coiling central axis 300 of coiling portion 317a from the stating point and the ending point of coiling portion 317a, respectively. As will be described, flexible substrate 317 allows the winding state of coiling portion 317a to change, or implicitly, permits coiling portion 317a to become larger or smaller like a flat spiral spring, so that first connecting portion 317e may be rotated relative to second connecting portion 317f.

In this case, it is advantageous to provide a cutout or slit 317g as stated above for at least one of first and second connecting portions 317e and 317f. For example, in the embodiment shown in FIGS. 15 and 16, there is provided a slit 317g at the end of first connecting portion 317e.

This slit 317g forms, as stated above, a cutout for relieving the stress acted on first connecting portion 317e in the case shown in FIGS. 15 and 16, for example, where first connecting portion 317e is bent substantially perpendicular to coiling, central axis 300 of coiling portion 317a as shown, for example, in FIG. 18 (which will be detailed later). That is, the slit 317g or the aforementioned cutout allows flexible substrate 317 to be bent readily at an exit disposed in fixing holder (supporter) 318 without undergoing any stress even when the exit is formed in a semicircular shape.

Next, referring to FIGS. 17 and 18, description will be made of the fixing member (supporter) for fixing the connecting means used in the present invention. Here, FIG. 17 is a sectional view of essential parts, and FIG. 18 is a front illustrative view of essential parts.

Figure 17:
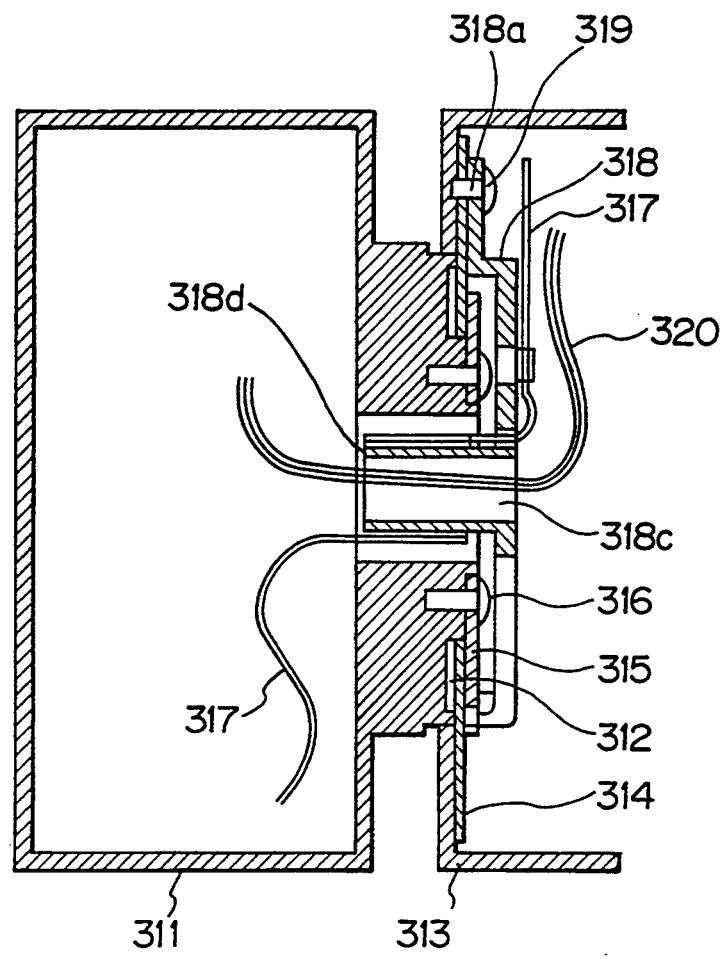
FIG. 17 is a sectional illustrative view showing essential parts of the embodiment of a connecting means used in the present invention.
Figure 18:
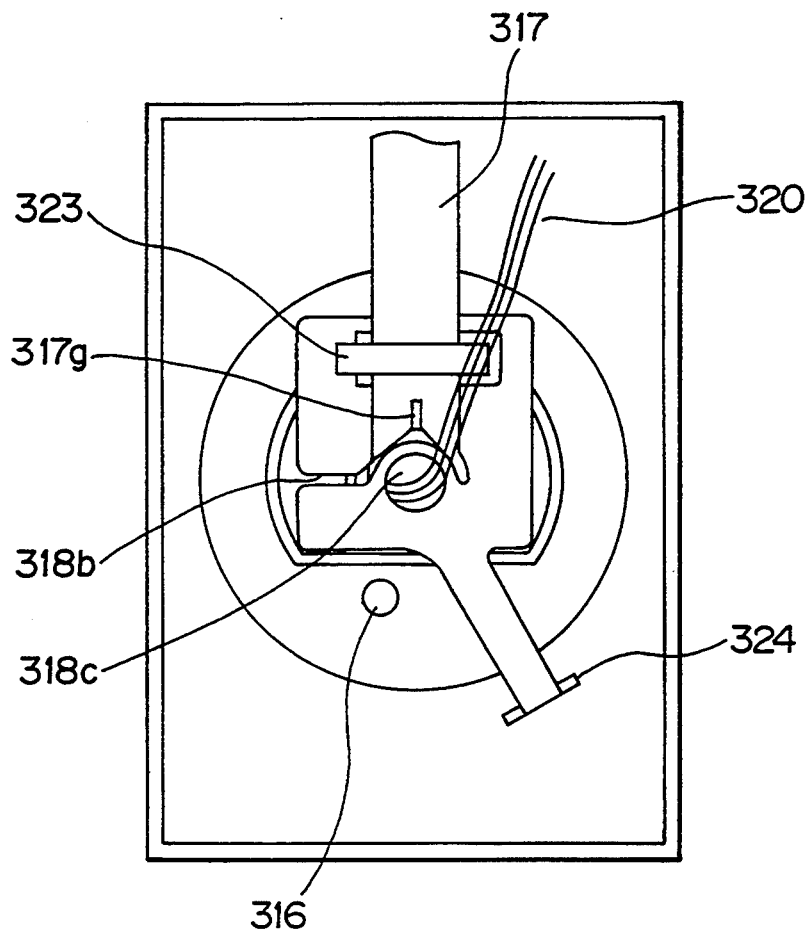
FIG. 18 is a front illustrative view showing essential parts of the embodiment of a connecting means used in the present invention.

In FIGS. 17 and 18, a fixing holder (supporter) 318 for a fixing member includes a through-hole 318a for fixing screw to fix the fixing holder (supporter), a flexible substrate-receiving slit 318b, a hollow 318c for inserting lines, and a fitting portion (supporting portion) 318d.

The attachment of flexible substrate 317 to a metal plate 314 through fixing holder (supporter) 318 is carried out by inserting fitting portion (supporting portion) 318d into hollow portion 317d of flexible substrate 317 (see FIG. 15), inserting the first connecting portion 317e of the flexible substrate into flexible substrate receiving slit 318b which is in a shape of a semicircular clearance, fixing both flexible substrate 317 and fixing holder (supporter) 318 together, and securing fixing holder (supporter) 318 by fitting a screw 319 into a screw hole 314a disposed on plate metal 314 through-hole 318a for fixing screw while the lower portion of fixing holder (supporter) 318 being inserted into a slit 324.

Next, the rotary movement of the connecting means used in the present invention will be described with reference mainly to FIGS. 17 and 18.

As shown in FIG. 17, as to the connecting means of the invention, viewfinder 311, leaf spring 312 and disc 315 integrally rotate with respect to main body cabinet 313 and plate metal 314 disposed on the VTR body. In this case, plate metal 314 is put between leaf spring 312 and disc 315, so the rotation can be made receiving a certain frictional force.

As viewfinder 311 rotates against main body cabinet 313, flexible substrate 317 undergoes a twisting force to thereby generate a force acting along the circumferential direction of the coiling circle. This force acts on the coil such that the coil is enlarged or reduced like a flat spiral spring in its radial direction with central axis 300 as a center, allowing viewfinder 311 to rotate across a broad angle.

In order to effect enlargement and reduction in the coiling diameter smoothly, both ends of the rotary portion must be surely engaged or caught. As specific means to achieve this, after fixing flexible substrate 317 to fitting portion (supporting portion) 318d of fixing holder (supporter) 318 shown in the figure, first connecting end 317e of flexible substrate 317 having slit 317g in the middle thereof for readily shaping circularly, is inserted into flexible substrate receiving slit 318b of semicircular shape formed in fixing holder (supporter) 318. Second connecting end 317f of flexible substrate 317 is to be fixed on the view finder side (not shown).

Disposed through hollow 318c of the holder (supporter) is a bundle of lead wires 320, so that flexible substrate 317 and bundle of lead wires 320 are to move separately. In this case, assuming that the view finder side is fixed in FIG. 18, the side of fixing holder (supporter) 318 can be considered to rotate. As there is provided a slit 317g in coiling portion 317a in the flexible substrate, if the exit of fixing holder (supporter) 318 is circularly shaped, no stress would be imposed and the substrate can be bent at the exit. The connecting end on the viewfinder side is extracted from the outer circumference of the rotary part of the flexible substrate so that the flexible substrate comes out substantially flat without being bent circularly. Therefore, there is no need to form a slit on the side.

Thus, by fixing the flexible substrate securely while the bundle of lead wires is separately fixed, the possibility of interference between the former and the latter can be excluded, thus making it possible to prevent the generation of both noise and disconnection with a compact design.

Figure 19:
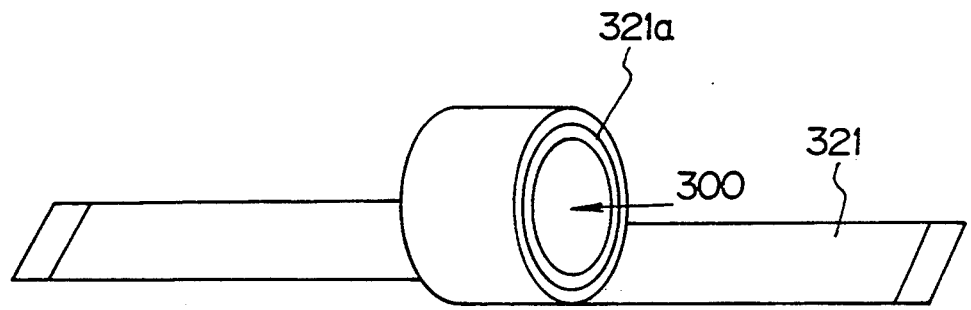
FIG. 19 is an illustration showing essential parts of another embodiment of a connecting means used in the present invention.
Figure 20:
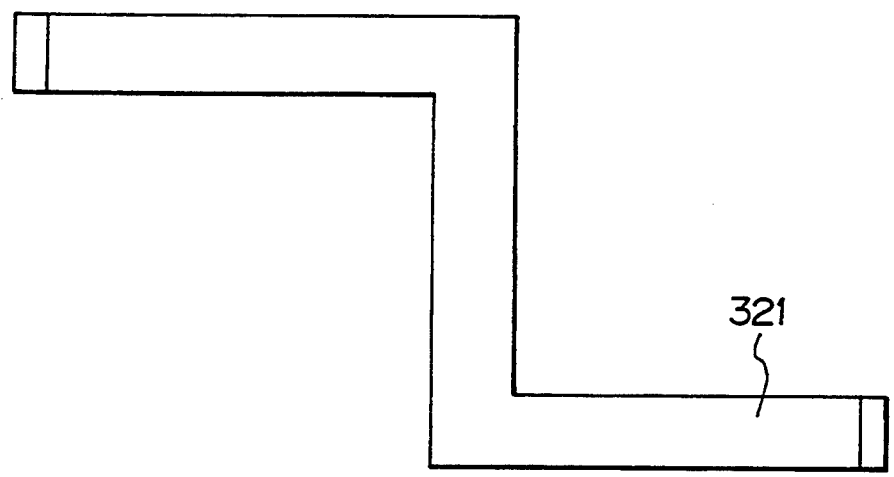
FIG. 20 is an expanded view showing essential parts of the same embodiment of a connecting means used in the present invention.

Another embodiment can be provided by a flexible substrate 321 without a slit thereon as shown in FIGS. 19 and 20. In a case where the coiling diameter of a rotary portion 321a is large enough compared to the width of the flexible substrate, the end portions of the flexible substrate come out of the rotary portion substantially flat so that the slit as in flexible member 317 can be left out.

Figure 21:
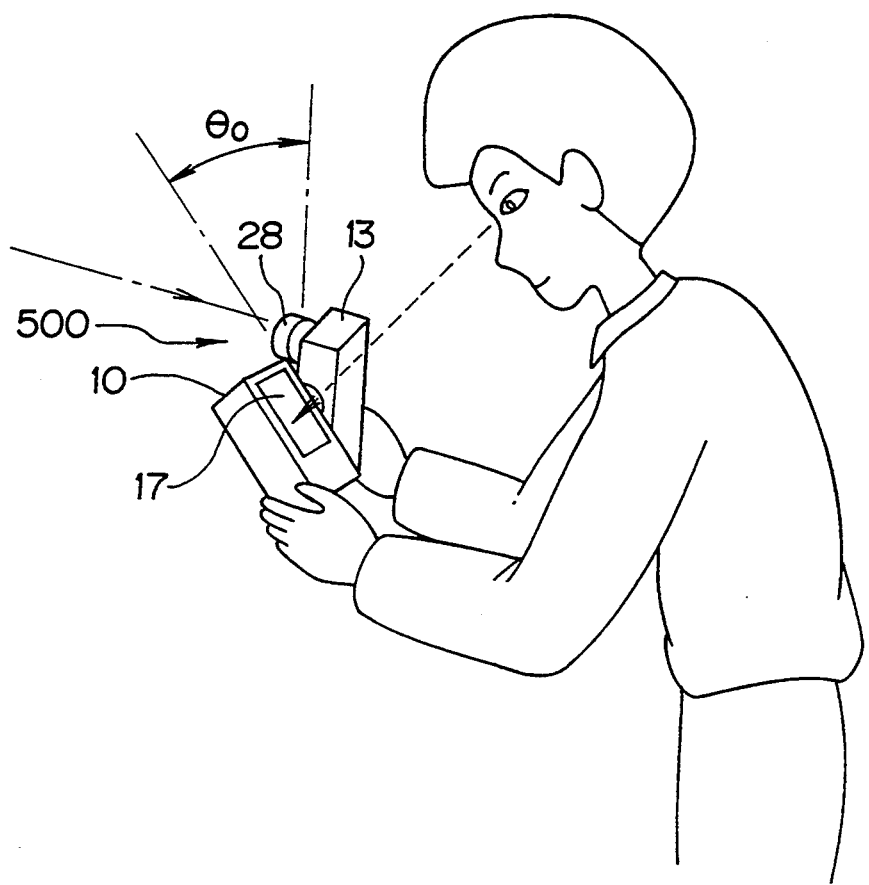
FIG. 21 is an illustration showing a use mode of a VTR with a monitor-equipped built-in camera of the embodiment wherein normal picture-recording is effected.
Figure 22:
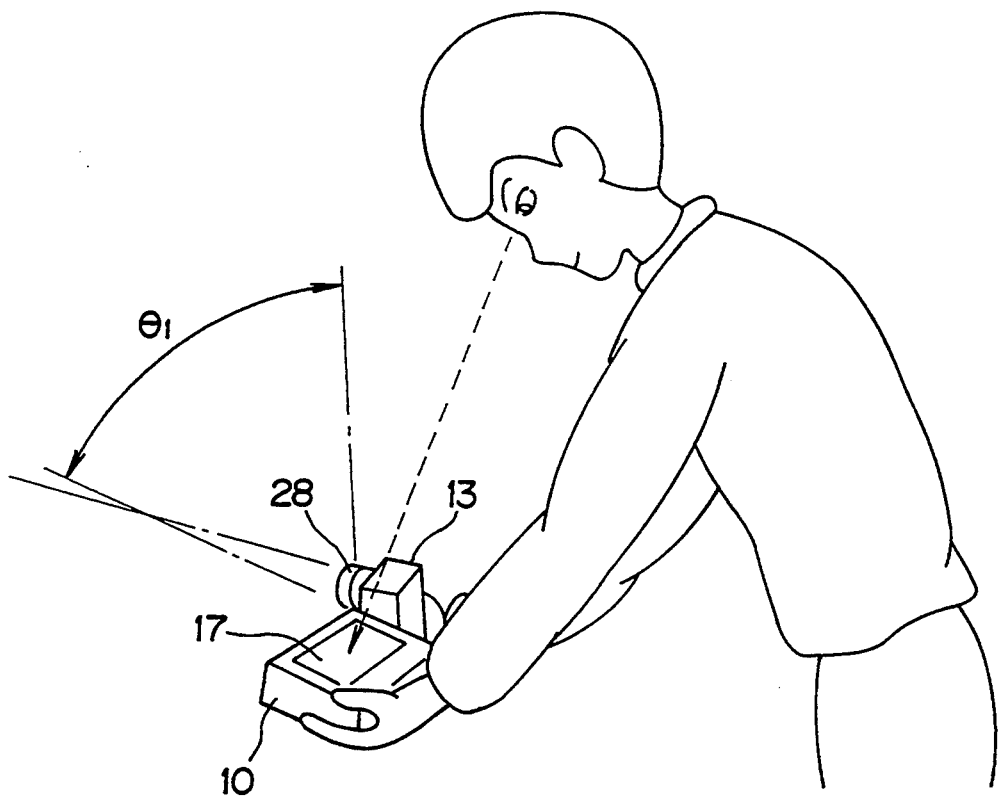
FIG. 22 is an illustration showing a use mode of a VTR with a monitor-equipped built-in camera of the embodiment wherein low angle picture-recording is effected.
Figure 23:
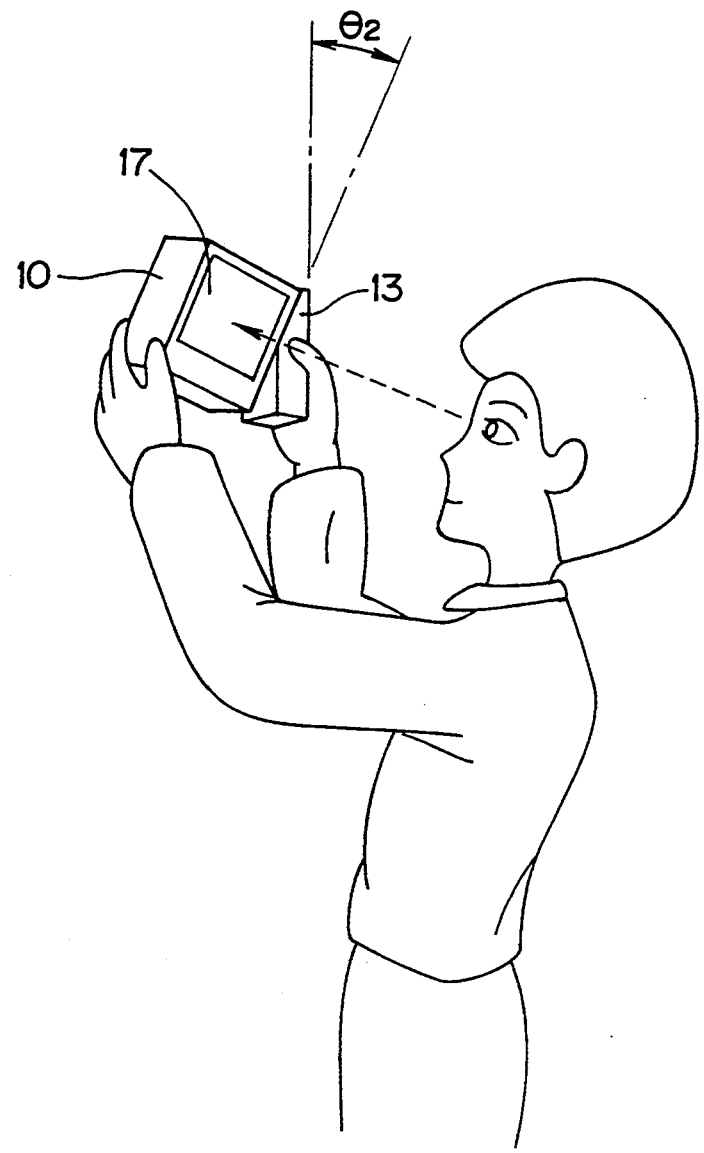
FIG. 23 is an illustration showing a use mode of a VTR with a monitor-equipped built-in camera of the embodiment wherein high angle picture-recording is effected.

Finally, various picture recording situations using the VTR with a monitor-equipped built-in camera of the invention will be shown specifically in FIGS. 21 to 24. FIG. 21 shows a normal picture recording situation. In this case, monitor/VTR portion 10 is rotated counterclockwise by a referential angle $\theta_0$ from non-use storage position with respect to camera portion 13. The view line of the operator is oriented 45° downward from the level while the operator stands substantially upright. FIG. 22 shows a state of low angle picture recording. In this case, monitor/VTR portion 10 is rotated counterclockwise by a referential angle $\theta_1$ with respect to camera portion 13. In this case, with $\theta_1 > \theta_0$, the operator bends slightly forward while the view line of the operator is directed substantially downward. FIG. 23 shows a state of high angle picture recording. In this case, monitor/VTR portion 10 is rotated counterclockwise by an angle $\theta_2$ from a storage position at non-use with respect to camera portion 13. In this case, the view line of the operator is inclined upward. Thus, by setting up the camera angle and monitor screen angle freely, it is possible for an operator to record pictures and visually check the pickup condition of a subject displayed on a relatively large-sized liquid crystal display panel 17, while keeping his or her eyes away from the liquid crystal display panel 17 or VTR of the a monitor-equipped built-in camera 500.

FIG. 24 shows a state of self-image recording. Monitor/VTR portion 10 is rotated 180° from a storage position at non-use with respect to camera portion 13 so as to turn the picture-pickup face of lens unit 28 and liquid crystal display panel 17 toward the same direction. This 180° rotation activates inversion detecting switch 89 to drive the IC for image upside-down inversion, thus displaying an image inverted upside down on liquid crystal display panel 17. Then putting the VTR with a monitor-equipped built-in camera 500 on a table 90 or other place, an operator him- or herself controls the VTR with a monitor-equipped built-in camera 500 with a remote control transmitter 91 keeping some distance therefrom. The remote control operation includes zoom adjustment, start of picture-recording, pose, stop, etc. A remote control sensor 20 receives infrared remote control signals emitted from remote control transmitter 91 to effect predetermined control operations. In this self-image pickup mode, the operator effects picture-recording of his or her own figure by him- or herself while the liquid crystal display panel 17 displays his or her upright image after the upside-down inversion. Since the screen size of liquid crystal display panel 17 is relatively large, it is possible for the operator to visually check the recording condition of the subject at some distance correctly.

Here, on a condition that the VTR with a monitor-equipped built-in camera 500 is set on a tripod, if rotary mechanism 14 is adapted to be driven by a motor, the apparatus can be controlled by remote control transmitter 91 to drive the motor, thus remote-controlling the relative angle of camera portion 13 to monitor/VTR portion 10.

In accordance with the thus configurated VTR with a monitor-equipped built-in camera of the present invention, an operator can freely set up a camera angle and a monitor screen angle by rotating the monitor/VTR portion relative to the camera portion through the rotational mechanism, and the operator can visually check the picture recording condition of a subject displayed on the monitor portion of a relatively large-sized liquid crystal screen while keeping his or her eyes away from the monitor. Further, since the VTR substrate and the liquid crystal substrate are stocked and sandwiched between the monitor portion and the VTR portion, the apparatus can be small-sized as compared to the prior art example in which a monitor portion and a VTR portion are put together side by side to form an integrated rectangular body. Since the camera portion can be rotated through the rotary mechanism so that the pickup face of the camera portion may be oriented in the same direction with the face of the liquid crystal screen of the monitor portion and at the same time the display image is inverted upside down by changing over the inversion detecting switch, an operator can readily effect self-image recording to pick up him- or herself as the subject while monitoring a normal upright subject image displayed on the monitor portion.

In addition, according to the VTR with a monitor-equipped built-in camera, since batteries, contained in the camera portion and covered by the battery cover is gripped over the battery cover, the installation of the batteries can be assured reliably as well as improving the gripping performance.

Moreover, in the present invention, by providing a rotary portion as a part of the connecting means as described above, it is possible to provide a larger rotating angle of the joining portion and an improved durability of the connecting means. The provision of a fixing member for fixing the rotary portion prevents interference of the connecting means with the peripheral members and can make the connecting means compact.

What is claimed is:

1. A VTR with a monitor-equipped built-in camera comprising:
   a monitor/VTR portion integrally formed of a VTR portion holding a removable tape cassette and a monitor portion including a liquid crystal display device;
   a camera portion;
   a rotary mechanism attaching said camera portion to said monitor/VTR portion in a relatively rotatable manner;
   inverting means for inverting a displayed image on said monitor;
   detection means disposed in said rotary mechanism for detecting a rotational state of said camera portion relative to said monitor/VTR portion; and wherein
   said inverting means is driven based on the output from said detection means.

2. A VTR with a monitor-equipped built-in camera according to claim 1, wherein said detection means generates a detection output when a picture-pickup face of said camera portion is oriented in a direction substantially parallel to the display surface of said monitor portion.

3. A VTR with a monitor-equipped built-in camera according to claim 1, wherein said rotary mechanism is remote-controlled by a remote control device.

4. A VTR with a monitor-equipped built-in camera according to claim 1, wherein said monitor/VTR portion has a VTR driving substrate for driving said VTR portion and a monitor driving substrate for driving said monitor portion, said VTR driving substrate and said monitor driving substrate integrally sandwiched between said monitor portion and said VTR portion.

5. A VTR with a monitor-equipped built-in camera according to claim 4, wherein the dimensions of said VTR driving substrate and said monitor driving substrate are smaller than the outside dimension of the display surface of said monitor portion.

6. A VTR with a monitor-equipped built-in camera according to claim 1, wherein said camera portion holds removable batteries as power supply source for said VTR with a monitor-equipped built-in camera, and has a removable battery cover for covering and protecting said batteries which also serves as a camera grip.

7. A VTR with a monitor-equipped built-in camera according to any one of claim 2, 5, 1, 3, 4, and 5, wherein said rotary mechanism comprises:
   a flexible connecting member for electrically connecting plural rotatable parts, said connecting member including,
   a coiling portion having a vortex structure and a coiling central axis, and disposed in a central portion of said connecting member,
   first and second connecting portions extracted respectively from a starting end and a terminal end of said coiling portion and extending parallel to said coiling central axis, and wherein
   said coiling portion has a coiling state which changes so that said first and second connecting portions rotate relative to one another.

8. A VTR with a monitor-equipped built-in camera according to claim 7, wherein said coiling portion has a hollow central portion along said coiling central axis, and a supporting member is provided which has a supporting portion inserted into said hollow portion for supporting said connecting member.

9. A VTR with a monitor-equipped built-in camera according to claim 8, wherein the supporting portion of said supporting member is provided with a hollow portion through which connecting cables are passed.

10. A VTR with a monitor-equipped built-in camera according to any one of claims 2, 5, 1, 3, 4, and 6, wherein said rotary mechanism comprises:
    a flexible connecting member for electrically connecting plural rotatable parts, said connecting member including,
    a coiling portion having a vortex structure and a coiling central axis, and disposed in a central portion of said connecting member,
    first and second connecting portions extracted respectively from a starting end and a terminal end of said coiling portion and extending parallel to said coiling central axis, and wherein
    said coiling portion has a coiling state which changes so that said first and second connecting portions rotate relative to one another, and at least one of said first and second connecting portions is provided with a cutout portion for relieving stress acting on said connecting portion when said connecting portion is bent substantially, perpendicular relative to the coiling central axis of said coiling portion.

11. A VTR with a monitor-equipped built-in camera according to claim 10, wherein said coiling portion has a hollow central portion along said coiling central axis, and a supporting member is provided which has a supporting portion inserted into said hollow portion for supporting said connecting member.

12. A VTR with a monitor-equipped built-in camera according to claim 11, wherein said support portion includes a hollow portion through which connecting cable are passed.

* * * * *

UNITED STATES PATENT AND TRADEMARK OFFICE
CERTIFICATE OF CORRECTION

PATENT NO. : 5,442,453

DATED : August 15, 1995

INVENTOR(S) : Minori TAKAGI, Kouji ARAMAKI, Takeshi IKEDA

It is certified that error appears in the above-identified patent and that said Letters Patent is hereby corrected as shown below:

in column 15, line 49, change "and 5" to --and 6--

Signed and Sealed this

Twenty-sixth Day of December, 1995

Attest:

BRUCE LEHMAN

Attesting Officer        Commissioner of Patents and Trademarks